US010185596B2

(12) United States Patent
Roese et al.

(10) Patent No.: US 10,185,596 B2
(45) Date of Patent: Jan. 22, 2019

(54) CLOUD BOOK REGISTRY FOR CLOUD SERVICE PROVIDERS WHEREIN THE CONSUMER CAN ACCESS THE PROFILE FOR EACH CLOUD SERVICE PROVIDER AND SERVICE USAGE OF OTHER CONSUMERS

(71) Applicant: EMC Corporation, Hopkinton, MA (US)

(72) Inventors: John J Roese, Newmarket, NH (US); Stephen J Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 760 days.

(21) Appl. No.: 14/318,831

(22) Filed: Jun. 30, 2014

(65) Prior Publication Data
US 2015/0378788 A1    Dec. 31, 2015

(51) Int. Cl.
*G06F 9/50* (2006.01)
*H04L 29/08* (2006.01)
*H04W 4/21* (2018.01)

(52) U.S. Cl.
CPC ............ *G06F 9/5072* (2013.01); *H04L 67/10* (2013.01); *H04W 4/21* (2018.02)

(58) Field of Classification Search
CPC ...... G06F 9/5072; H04W 4/206; H04L 67/10; H09W 4/21
USPC ......................................................... 709/203
See application file for complete search history.

(56) References Cited

U.S. PATENT DOCUMENTS

| 6,751,295 | B2 * | 6/2004 | McCulley | H04M 3/36 379/10.01 |
| 7,069,242 | B1 * | 6/2006 | Sheth | G06Q 30/06 705/37 |
| 7,092,508 | B2 * | 8/2006 | Brown | H04M 3/42 379/265.06 |
| 7,272,575 | B2 * | 9/2007 | Vega | G06Q 20/10 705/26.41 |
| 7,275,044 | B2 * | 9/2007 | Chauvin | G06Q 30/0633 705/26.8 |
| 7,743,110 | B2 * | 6/2010 | Chauvin | G06Q 30/06 709/200 |
| 7,831,693 | B2 * | 11/2010 | Lai | G06Q 10/10 706/27 |
| 7,933,785 | B2 * | 4/2011 | Mau | G06Q 40/02 705/3 |
| 8,073,762 | B2 * | 12/2011 | Sheth | G06Q 30/06 705/37 |
| 8,346,929 | B1 * | 1/2013 | Lai | G06Q 10/10 709/226 |

(Continued)

*Primary Examiner* — Daniel C. Murray
(74) *Attorney, Agent, or Firm* — Daly, Crowley, Mofford & Durkee, LLP

(57) ABSTRACT

A computer implemented method, system and computer program product enabling cloud service providers to register in a cloud book is presented. The cloud book includes a profile for each cloud service provider of the cloud service providers including the services and terms of service for each cloud service provider. Consumers register in the cloud book; users are able to connect to each other; and the users are able to browse the cloud service providers' connection to consumers. Each consumer is enabled to compare the services and terms of service to determine which service provider has services that match the consumer.

15 Claims, 11 Drawing Sheets

(56) References Cited

U.S. PATENT DOCUMENTS

| | | | | |
|---|---|---|---|---|
| 8,402,086 B2* | 3/2013 | Driesen | G06Q 10/06 | 709/201 |
| 8,417,715 B1* | 4/2013 | Bruckhaus | G06F 17/30994 | 705/26.1 |
| 8,688,764 B2* | 4/2014 | Chauvin | G06Q 30/06 | 709/200 |
| 8,706,607 B2* | 4/2014 | Sheth | G06Q 30/06 | 705/37 |
| 8,769,651 B2* | 7/2014 | Grajek | H04L 63/0815 | 726/10 |
| 8,782,637 B2* | 7/2014 | Khalid | G06F 8/61 | 718/1 |
| 8,788,535 B2* | 7/2014 | Bonev | G06Q 10/109 | 707/793 |
| 8,977,754 B2* | 3/2015 | Curry, Jr. | G06Q 30/08 | 709/226 |
| 9,071,606 B2* | 6/2015 | Braun | H04L 63/10 | |
| 9,197,709 B2* | 11/2015 | Caputo, II | H04L 67/16 | |
| 9,264,977 B2* | 2/2016 | Uhlik | H04L 12/14 | |
| 9,274,848 B2* | 3/2016 | Dawson | G06F 9/5072 | |
| 9,369,457 B2* | 6/2016 | Grajek | H04L 63/0815 | |
| 9,414,248 B2* | 8/2016 | Kovvali | H04W 24/08 | |
| 9,544,734 B2* | 1/2017 | Turgeman | G06Q 30/06 | |
| 2002/0069079 A1* | 6/2002 | Vega | G06Q 20/10 | 705/80 |
| 2002/0101879 A1* | 8/2002 | Bouret | H04L 63/0869 | 370/465 |
| 2003/0038881 A1* | 2/2003 | Chauvin | G06Q 30/06 | 348/207.1 |
| 2003/0038882 A1* | 2/2003 | Chauvin | G06Q 30/06 | 348/207.1 |
| 2003/0040974 A1* | 2/2003 | Chauvin | G06Q 30/06 | 705/26.62 |
| 2003/0040983 A1* | 2/2003 | Chauvin | G06Q 30/0633 | 705/26.8 |
| 2004/0201682 A1* | 10/2004 | Chauvin | G06Q 30/06 | 348/207.1 |
| 2005/0015277 A1* | 1/2005 | Mau | G06Q 40/02 | 705/2 |
| 2005/0165656 A1* | 7/2005 | Frederick | G06Q 20/102 | 705/26.1 |
| 2006/0095366 A1* | 5/2006 | Sheth | G06Q 30/06 | 705/37 |
| 2006/0253596 A1* | 11/2006 | Barone | H04L 67/306 | 709/229 |
| 2007/0038525 A1* | 2/2007 | Waldvogel | G06Q 30/02 | 705/27.1 |
| 2008/0021794 A1* | 1/2008 | Vega | G06Q 20/10 | 705/14.66 |
| 2008/0065402 A1* | 3/2008 | Sanamrad | G06F 9/5055 | 705/7.41 |
| 2008/0080552 A1* | 4/2008 | Gates | H04L 12/66 | 370/468 |
| 2008/0082490 A1* | 4/2008 | MacLaurin | G06F 17/30864 | |
| 2008/0140577 A1* | 6/2008 | Rahman | G06Q 20/3829 | 705/71 |
| 2008/0281675 A1* | 11/2008 | Zhang | G06Q 30/02 | 705/14.67 |
| 2009/0055877 A1* | 2/2009 | Rhim | H04N 21/2665 | 725/87 |
| 2009/0292582 A1* | 11/2009 | Ebert | G06Q 10/0639 | 705/7.38 |
| 2009/0300635 A1* | 12/2009 | Ferris | G06F 9/5072 | 718/104 |
| 2010/0198840 A1* | 8/2010 | Basu | G06F 17/30873 | 707/749 |
| 2010/0332262 A1* | 12/2010 | Horvitz | G06F 9/5027 | 705/4 |
| 2011/0055034 A1* | 3/2011 | Ferris | G06Q 30/0283 | 705/26.1 |
| 2011/0138050 A1* | 6/2011 | Dawson | G06F 9/5072 | 709/226 |
| 2011/0145094 A1* | 6/2011 | Dawson | G06F 9/5027 | 705/26.63 |
| 2012/0016778 A1* | 1/2012 | Salle | G06F 9/5072 | 705/27.1 |
| 2012/0041832 A1* | 2/2012 | Sheth | G06Q 30/06 | 705/26.2 |
| 2012/0109774 A1* | 5/2012 | Chernenko | G06Q 30/08 | 705/26.4 |
| 2012/0166310 A1* | 6/2012 | Werklund | G06Q 30/0613 | 705/26.41 |
| 2012/0290460 A1* | 11/2012 | Curry, Jr. | G06Q 30/08 | 705/37 |
| 2012/0311564 A1* | 12/2012 | Khalid | G06F 8/61 | 718/1 |
| 2013/0204716 A1* | 8/2013 | Rehman | G06Q 30/0601 | 705/14.73 |
| 2014/0074647 A1* | 3/2014 | Mukherjee | G06Q 30/06 | 705/26.7 |
| 2014/0200947 A1* | 7/2014 | Gujar | G06Q 30/0631 | 705/7.26 |
| 2014/0201293 A1* | 7/2014 | Turakhia | H04L 51/04 | 709/206 |
| 2014/0214496 A1* | 7/2014 | MacBeath | G06Q 30/0283 | 705/7.37 |
| 2014/0279192 A1* | 9/2014 | Selby | G06Q 30/0631 | 705/26.7 |
| 2014/0280848 A1* | 9/2014 | Modh | G06Q 30/0631 | 709/223 |
| 2014/0280932 A1* | 9/2014 | Braun | H04L 63/10 | 709/225 |
| 2014/0282037 A1* | 9/2014 | Narasimhan | G06Q 30/0631 | 715/738 |
| 2015/0007299 A1* | 1/2015 | Grajek | G06F 17/30876 | 726/8 |
| 2015/0039467 A1* | 2/2015 | Kothari | G06F 3/1253 | 705/26.41 |
| 2015/0067171 A1* | 3/2015 | Yum | H04L 67/2809 | 709/226 |
| 2015/0178805 A1* | 6/2015 | Curry, Jr. | G06Q 30/08 | 705/26.41 |
| 2015/0228003 A1* | 8/2015 | Iyoob | G06Q 30/0631 | 705/26.64 |
| 2015/0332351 A1* | 11/2015 | McBride | H04L 41/5054 | 705/14.73 |
| 2015/0332357 A1* | 11/2015 | McBride | G06Q 30/0601 | 705/26.1 |
| 2015/0333979 A1* | 11/2015 | Schwengler | H04L 41/5054 | 709/226 |
| 2016/0019636 A1* | 1/2016 | Adapalli | G06Q 30/0641 | 705/26.62 |
| 2016/0021097 A1* | 1/2016 | Shrotri | H04L 63/0815 | 726/8 |
| 2016/0065417 A1* | 3/2016 | Sapuram | G06Q 30/0631 | 709/223 |
| 2016/0125489 A1* | 5/2016 | Gupte | G06Q 30/0603 | 705/26.61 |
| 2016/0180414 A1* | 6/2016 | Willard | G06Q 30/0282 | 705/347 |
| 2016/0260157 A1* | 9/2016 | Krook | G06Q 30/0635 | |
| 2017/0111351 A1* | 4/2017 | Grajek | H04L 63/0815 | |

\* cited by examiner

US 10,185,596 B2

CLOUD BOOK REGISTRY FOR CLOUD SERVICE PROVIDERS WHEREIN THE CONSUMER CAN ACCESS THE PROFILE FOR EACH CLOUD SERVICE PROVIDER AND SERVICE USAGE OF OTHER CONSUMERS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to a Cloud Environment.

RELATED APPLICATIONS

This Application is related to U.S. patent application Ser. No. 14/320,001 entitled "CONTENT FABRIC FOR A DISTRIBUTED FILESYSTEM", Ser. No. 14/320,069 entitled "CONVERGED INFRASTRUCTURES COMPRISING DISAGGREGATED COMPONENTS", Ser. No. 14/319,889 entitled "SOFTWARE OVERLAYS FOR DISAGGREGATED COMPONENTS", Ser. No. 14/318,805 entitled "APPLICATION AND INFORMATION MOVEMENT IN A CLOUD ENVIRONMENT", and Ser. No. 14/319,773 entitled "MIGRATING PRIVATE INFRASTRUCTURE SERVICES TO A CLOUD", filed on even date herewith, which are hereby incorporated herein by reference in their entirety.

BACKGROUND

As it is generally known, "cloud computing" typically refers to the use of remotely hosted resources to provide services to customers over one or more networks such as the Internet. Resources made available to customers are typically virtualized and dynamically scalable. Usually, cloud computing services may include any specific type of application. Conventionally, the software and data used to support cloud computing services are located on remote servers owned by a cloud computing service provider. Recently, use of the cloud computing service model has been growing due to the increasing availability of high bandwidth communication, making it possible to obtain response times from remotely hosted cloud-based services similar to those of services that are locally hosted.

Further, data storage demands continue to grow at a high rate. One area of growth that is testing information technology infrastructure is the billions of users and millions of applications supported in modern computing. As consumers and businesses alike adopt mobile devices, social platforms, cloud storage, and big data, the dynamics of how we store and protect data is changing as well. Some of these new platforms can be less trusted, less secure, and less resilient than the private cloud infrastructures operated by many enterprises. These private clouds have a set of hardened and reliable infrastructure services that make the data center trusted, secure and resilient.

However, there are benefits of storing, accessing, and utilizing data from the public cloud. For example, cost, flexibility, access to markets, and market trends all may make public clouds an attractive alternative for some storage needs and some applications. However, if consumers and businesses alike want to transition or migrate sensitive data, or data that must have a guaranteed level of resiliency, they need assurances that their needs will be met. Therefore, there exists a need to provide the same infrastructure services that make the private cloud trusted, secure, and resilient, in a public cloud environment.

SUMMARY

A computer implemented method, system and computer program product enabling cloud service providers to register in a cloud book; wherein the cloud book includes a profile for each cloud service provider of the cloud service providers including the services and terms of service for each cloud service provider of the cloud service providers; and enabling consumers to register in the cloud book; wherein the users are able to connect to each other; wherein the users are able to browse the cloud service providers' connection to consumers; wherein each consumer is enabled to compare the services and terms of service to determine which service provider has services that match the consumer; further wherein the cloud book enables a first consumer to sign up for services with a first cloud service provider.

DETAILED DESCRIPTION

Figure 1:
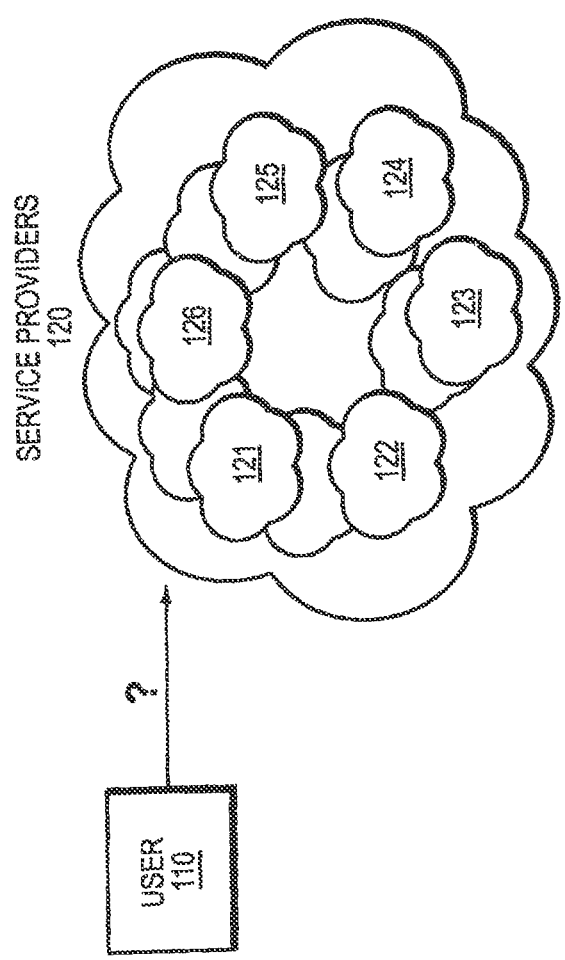
FIG. 1 is a simplified illustration of a user and service providers, in accordance with an embodiment of the present disclosure.

Today, consumption of cloud resources and services are often avoided because of a perceived lack of resiliency and trust in the cloud provider's infrastructure. Typically, over time, more and more providers may add trust and resiliency services into the cloud, making it more likely that an IT consumer will trust the placement of more of their applications and application data to the cloud. Generally, a wide variety of choice for IT consumers has the advantage of providing much more competitive pricing options. However, typically, IT consumers may be faced with the problem of having to choose between multiple providers, comparing them, connecting them, and in some cases overlaying them.

Generally, security analytics, data mobility, replication, and backup services may be runnable as both HW and SW instantiations and exist in not only consumer locations but also cloud service provider locations. Typically, security analytics may be services that contain network traces, security logs, and analytic capabilities to detect security intrusions or other harmful security events. Usually, data mobility may be services that can move application data "live" via active/active caching technology. Conventionally, replication may relate to services that can provide replication and point-in-time copy capabilities. Generally, backup may be related to services that can take snapshots of application data and use a backup server to copy them to secondary storage.

Today, these services usually do not have a common API or exist in a publically available and well documented catalog to advertise and to find "like kind" services, join together with "like kind" services, overlay each other in the same data center, or find and attach to each other to create graphed services. Often, this makes it impossible for consumers to find and attach to the right service for their needs.

Typically, dynamic and immediate catalogue comparison of services present at various cloud service providers is not available. Today's methods usually rely on conversations with cloud providers or browsing individual websites/agreements. Conventionally, both of these agreements do not scale. Usually, services in a specific cloud service provider's data center have no way to find and form connections with similar services in an alternate cloud service provider's data center. Generally, a service provider's ability to broadly advertise the appropriate level of cloud services to a community of potential consumers is not possible. Often, consumers using these services do not have a way to rate their experience in a public way, which assists other consumers in the locating and usage of these services. Conventionally, consumers looking to use services cannot find and view the experiences of similar consumers and leverage community experience in the selection of services. Generally, consumers wishing to combine services easily from multiple cloud service providers have no way to browse and connect them together.

In certain embodiments, the current disclosure may use social media approaches (e.g. "Like", "Follow", "Friend", "Block", "Poke", :Comment") to allow service providers, services, and consumers to create a navigable ecosystem for connecting IT consumers with the appropriate levels of cloud services. In some embodiments, the current disclosure may lead to graphs and reports that may enhance the experience of connecting to IT resources. In at least one embodiment, cloud service providers (CSP) may be enabled to "name themselves" and sign up for a "Cloud_Book" in a "Cloud_Book" registry. In alternative embodiments, services in any given CSP may register themselves as available services in a CSP Cloud_Book registry. In an embodiment, IT consumers may"follow" or "friend" a CSP and the CSP has the option to allow the "follow" (e.g. public Twitter account) or respond to the friend request. In at least one embodiment, this may give a consumer full visibility into the available services. In certain embodiments, a cloud provider's services may include one or more of security analytics, data mobility, replication, and backup services. In some embodiments, the services may be runnable as both HW and SW instantiations and exist in consumer locations and cloud service provider locations In some embodiments, IT consumers may have visibility into the followers or friends of the CSP. In many embodiments, the IT consumer may "friend" or "follow" their peers who may or may not be consuming IT resources from the CSP, and may be able to reach out directly for questions or comments about the peer's experiences. In most embodiments, IT consumers may "friend" a service or a set of services in a CSP, which may give the IT consumer visibility into the APIs provided by the service.

In at least one embodiment, APIs may include the ability to sign up for and use the service. In some embodiments, multiple services may be used, (e.g. combining replication with security analytics). In certain embodiments, when signing up for a service, the IT consumer may ask the service to become a friend to the same service in a different CSP (if it isn't already) as a way of utilizing multiple clouds (e.g. for the purpose of replication). In other embodiments, IT consumers may "like" or "comment" or "rate" on their experiences with the service. In certain embodiments, IT consumers may have visibility into the number of likes, ratings, or comments, and may perform searches to find CSPs and/or services that are popular or well-liked by their peers.

In certain embodiments, the current disclosure may enable a registry for service providers. In most embodiments, a service provider may create an entry in the registry denoting what services they offer as well as additional information about the service provider. In many embodiments, consumers of services may also register in a registry with service providers. In some embodiments, consumers may form relationships with service providers. In alternative embodiments, a relationship with a user may be that the user likes the service provider. In other embodiments, a relationship may be that the user is a consumer of the service provider. In further embodiments, a user may rate and leave comments for a service provider. In still further embodiments, users may form relationships with other users enabling the user to see information and relationships of the other user. In at least some embodiments, a user may be able to see what services other users consume and how they have rated service providers.

In further embodiments, analytics may be run on a cloud book. In certain embodiments, analysis may be performed to see what cloud service providers have what level of trust with consumers. In other embodiments, analysis may be performed on consumer churn and consumer comments to determine which cloud service providers respond to consumer feedback and which do not. In alternative embodiments, graph theory may be applied to a network of cloud service providers and cloud service consumers to determine different analyses. In an embodiment, an analysis may determine and/or compare what level of service a cloud provider states is provided by the cloud provider, with feedback of consumers of those services, to determine whether the cloud service provider provides the advertised level of service.

In certain embodiments, cloud service consumers may have access to the analytics run on cloud service providers. In other embodiments, cloud service consumers may be able to run analytical reports on cloud providers based on the services that the consumer desires. In other embodiments, cloud service providers may have access to analytics to improve the services offered. In some embodiments, cloud service providers may use analytics to diagnose problems to lower churn, where churn is the amount of customers leaving a service provider. In still further embodiments, a cloud service consumer may be able to browse connections in the cloud book to see what services of cloud service providers other consumers use and their level of satisfaction with those services.

In some embodiments, a cloud book registry may enable a consumer to consume the same services from two or more providers for redundancy. In further embodiments, a consumer may browse relationships other consumers have with a service provider to understand problems that may have occurred between the service provider and consumers. In further embodiments, a level of trust may be generated in an automated manner by performing analytics on a cloud book registry. In certain embodiments, a trust level by a service provider may be measured over time. In some embodiments, a prospective consumer may list the services and reliability the consumer desires and a cloud book may match the consumer with the service providers that match those services and reliability. In certain embodiments, a service provider may advertise their services on a cloud book. In some embodiments, in joining a cloud book a service provider may give permission for analytics to be run on the service provider and its relationships with consumers and consumer comments.

Refer now to the example embodiment of FIG. 1. In the example embodiment of FIG. 1, user 110 desires to consumer services from one or more service providers 121-126 of service providers 120. In this embodiment, user 110 may not have a way to determine which service provider is able to best provide the services to user 110 without contacting each service provider individually.

Figure 2:
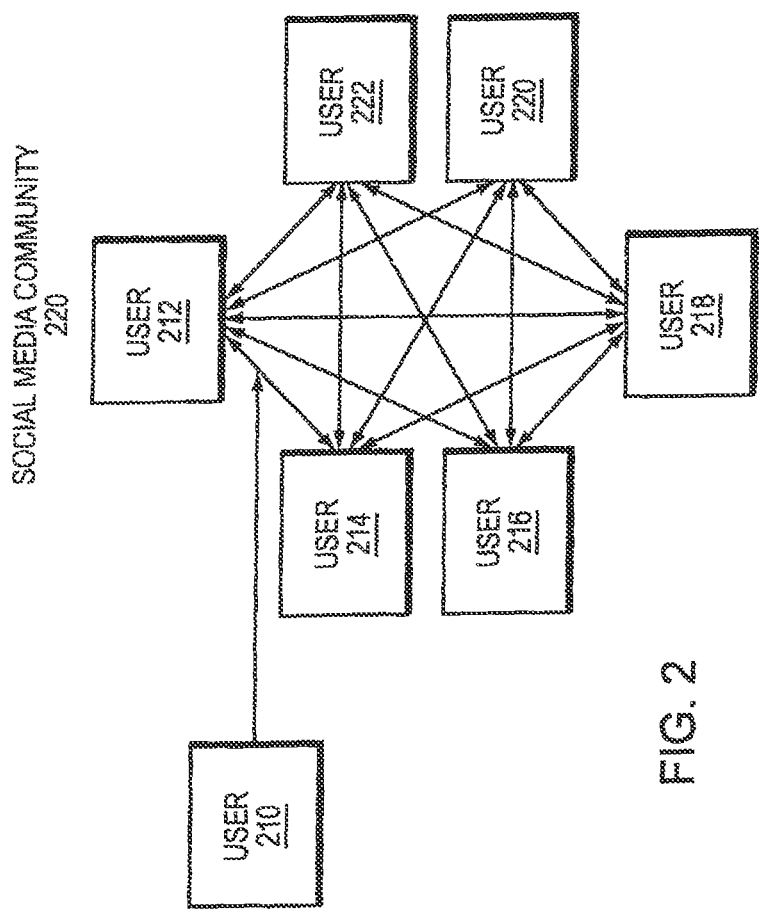
FIG. 2 is a simplified illustration of a user and a social media community, in accordance with an embodiment of the present disclosure.

Refer now to the example embodiment of FIG. 2. In the example embodiment of FIG. 2, user 210 may join a social media community 220 which has users 212, 214, 216, 218, 220, and 222. Refer now as well to the example embodiment of FIG. 3. Social media community 220 or Social media community 320 may be connected to service providers, such as service providers 315, which forms cloud book 350. In the example embodiment of FIG. 3, each user, such as user 312 consumes services from one or more service providers. For example, user 312 consumes services from service providers 321 and 326. User 314 consumes services from service provider 322. User 317 consumes services from service provider 325, user 316 consumes services from service provider 324, and user 318 consumes services from service provider 323. A user, such as user 310 is able to traverse the connections between users in social media community 320 and service providers 315 to determine which service provider provides which service and which consumers consume those services. In many embodiments, other information such as comments may be available by traversing the relationships between the social media community and service providers.

Figure 4:
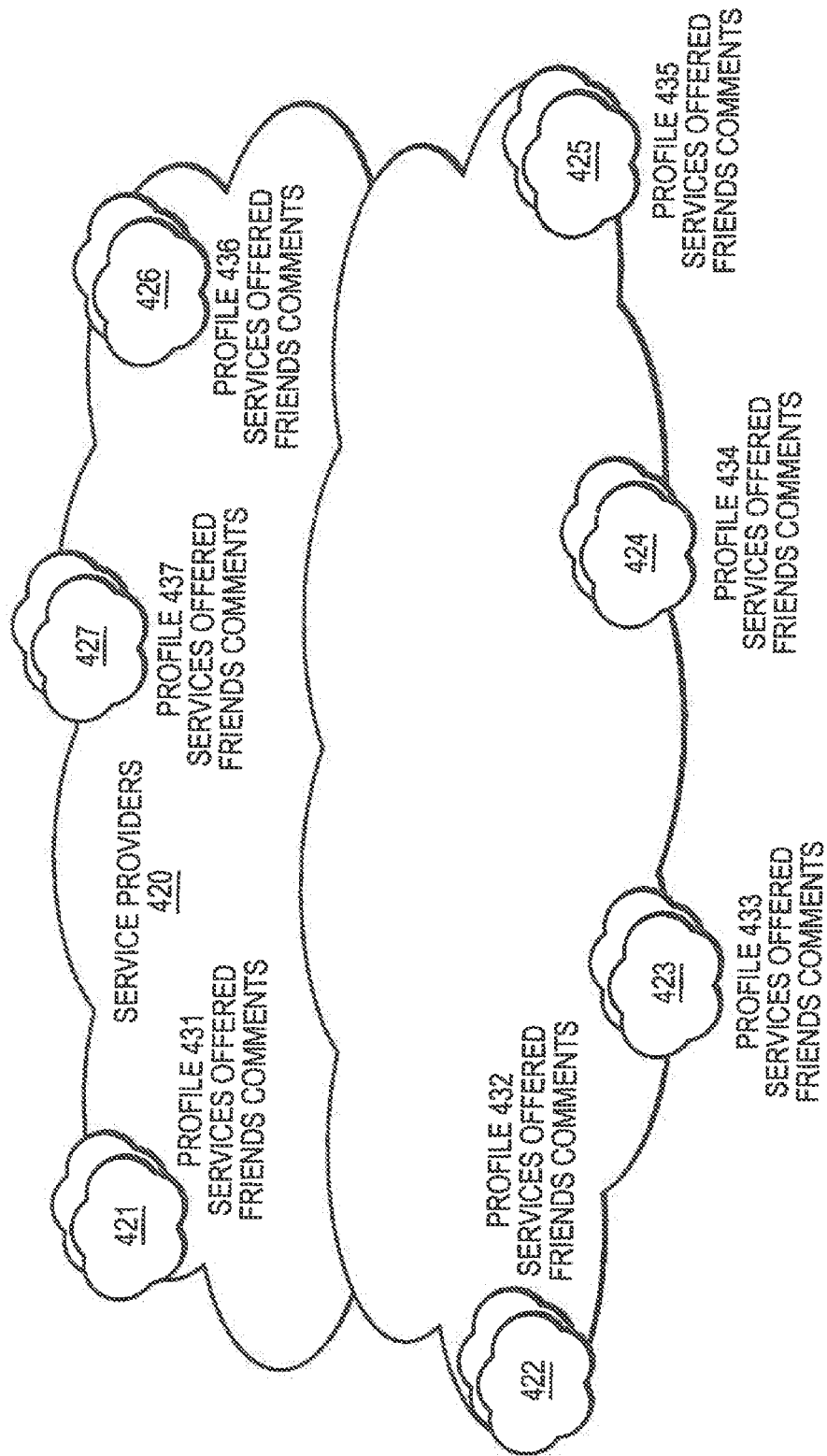
FIG. 4 is a simplified illustration of service providers and service providers' profiles, in accordance with an embodiment of the present disclosure.

Refer now to the example embodiment of FIG. 4, which illustrates service providers and service provider profiles. In the example embodiment of FIG. 4, service providers 421-427 are service providers 420. Each service provider has a profile such as profiles 431-437 respectively. Each profile contains information such as the services offered by that service provider, the friends of that service provider and comments.

Figure 5:
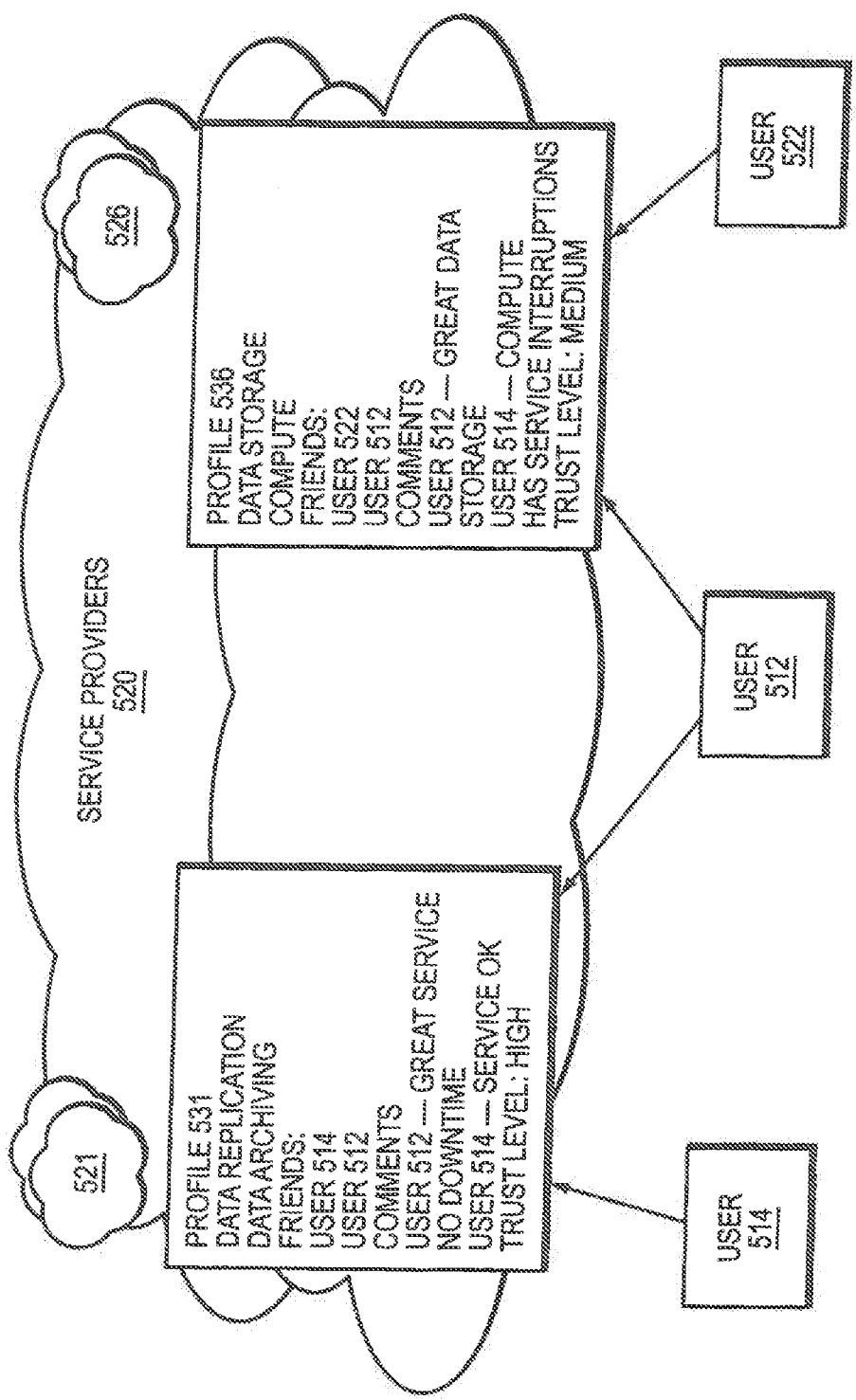
FIG. 5 is a simplified illustration of service providers, service providers' profiles, and users, in accordance with an embodiment of the present disclosure.

Refer now to the example embodiment of FIG. 5 which provides an example embodiment of profiles of different service providers. In the example embodiment of FIG. 5, service providers 520 include service provider 521 and 526. Service provider 521 has profile 531 and service provider 526 has service profile 536. Profile 531 indicates that service provider 521 offers data replication and data archiving services, has users 512 and 514 as friends, has two comments, and has a calculated high level of trust. Profile 536 indicates that service provider 526 offers data storage and computer services, has users 512 and 522 as friends, has two comments, and has a calculated medium level of trust.

Figure 3:
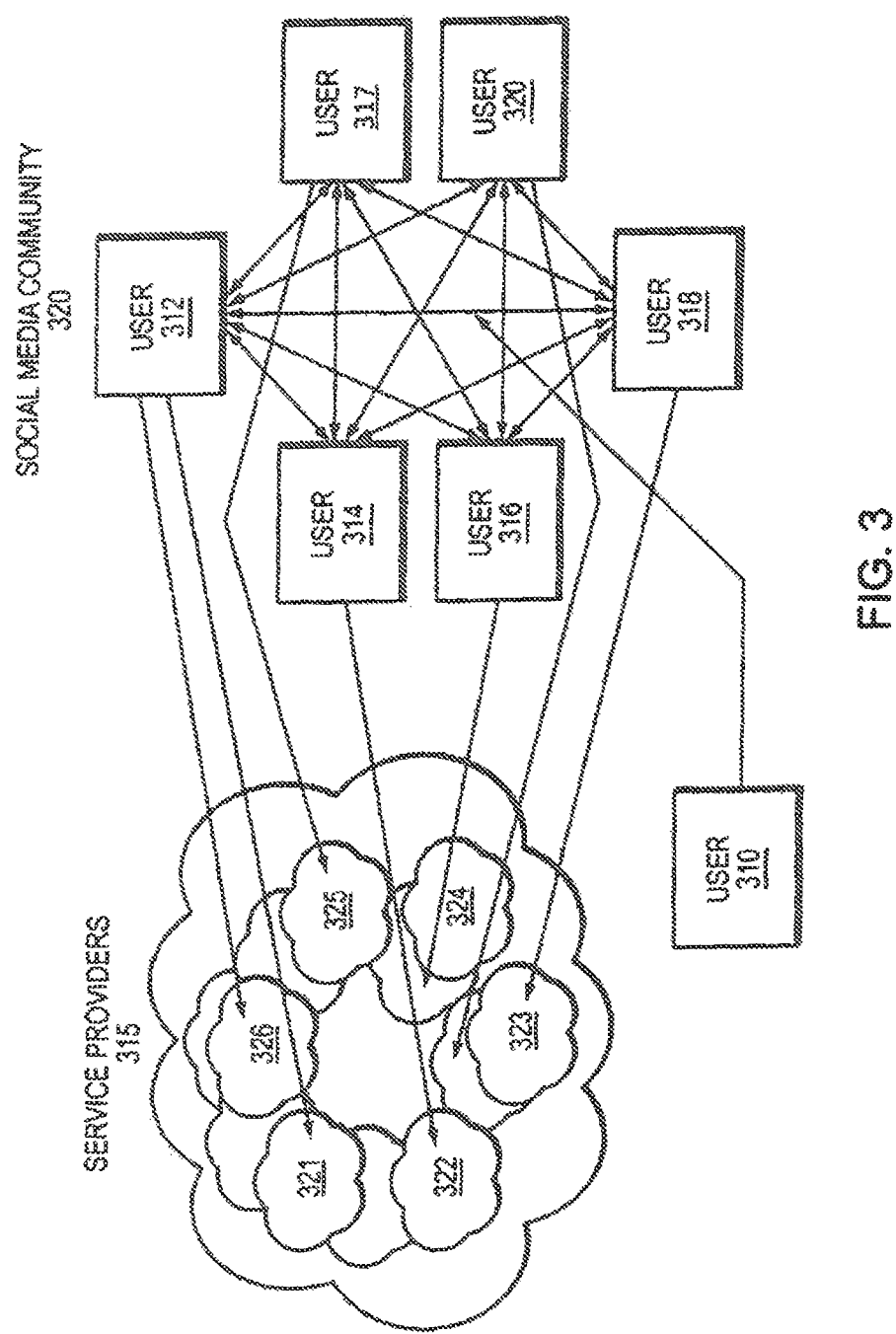
FIG. 3 is a simplified illustration of a user, service providers, and a social media community, in accordance with an embodiment of the present disclosure.
Figure 6:
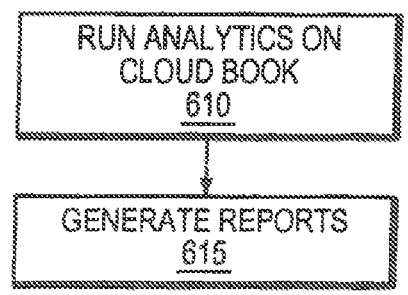
FIG. 6 is a method for running analytics on a cloud book, in accordance with an embodiment of the present disclosure.

Refer now to the example embodiments of FIGS. 3 and 6. Analytics are run on the cloud book of service providers 315 and social media community 320 (step 610). Reports on the analytics are generated (step 615). In some embodiments, the reports may indicate a level of trust for each of the service providers 315. In other embodiments, the reports may indicate whether a service provider is responsive to consumer input. In further embodiments, the reports may indicate the level of trust per service for each service provider. In still further embodiments, the reports may contain aggregate analytics on the service providers, number of consumers, and services offered.

Figure 7:
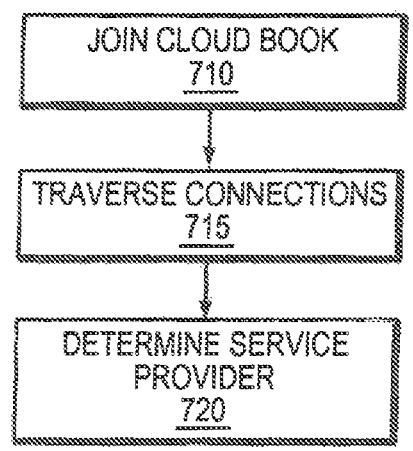
FIG. 7 is a method for joining a cloud book, in accordance with an embodiment of the present disclosure.

Refer now to the example embodiments of FIGS. 3 and 7. User 310 joins the cloud book of service providers 315 and social media community 320 (Step 710). User 310 traverses the connections in the cloud book (Step 715). Based on looking at what services service providers 315 offer and what connections and comments are made by social media community 320, user 310 determines what service provider would best suit user 310 (step 720). In many embodiments, a user may traverse the links of the user's friends to determine which services the consumer's friends use from which service providers. In certain embodiments, the user may examine the ratings of each of the service providers. In some embodiments, the user may determine a level of trust for the service providers.

Figure 8:
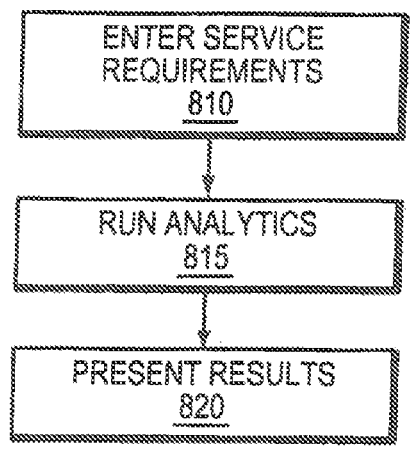
FIG. 8 is a method for running analytics on a cloud book to match a user with service providers, in accordance with an embodiment of the present disclosure.

Refer now to the example embodiments of FIGS. 3 and 8. User 310 enters service requirements that are needed (Step 810). Analytics are run on the cloud book of service providers 315 and social media community 320 to determine which service providers match the requirements (Step 815). Based on the analytics, the results of what service provider provides the correct services to user 310 are presented to user 310 (step 820). In certain embodiments, the analytics may match a user with a needed level of service and service provider that offers that level of services. In an embodiment, matching may be based on advertised service and reliability by a service provider. In other embodiments, consumer comments may be included in the analytics. In further embodiments, a user may be provided with two or more service providers that may be able to provide the user with the specified services. In still further embodiments, a user may select two or more service providers to ensure that the user has redundant services in case one service provider suffers a failure.

Figure 9:
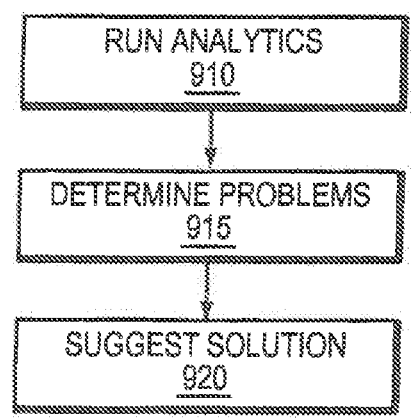
FIG. 9 is a method for determining problems with service providers, in accordance with an embodiment of the present disclosure.

Refer now to the example embodiments of FIGS. 3 and 9. Analytics are run on the cloud book of service providers 315 and social media community 320 (Step 910). Based on the analytics, problems are determined with service providers 315 (step 915). Solutions to the problems are suggested (Step 920). In certain embodiments, analytics may determine that a service provider has a high level of churn. In some embodiments, analytics may parse user comments to determine why churn occurs. In certain embodiments, based on user comments suggestions may be made to a service provider how services may be improved to raise customer satisfaction/trust and/or to lower churn. In certain embodiments, analytics may be performed based on keywords in comments.

Figure 10:
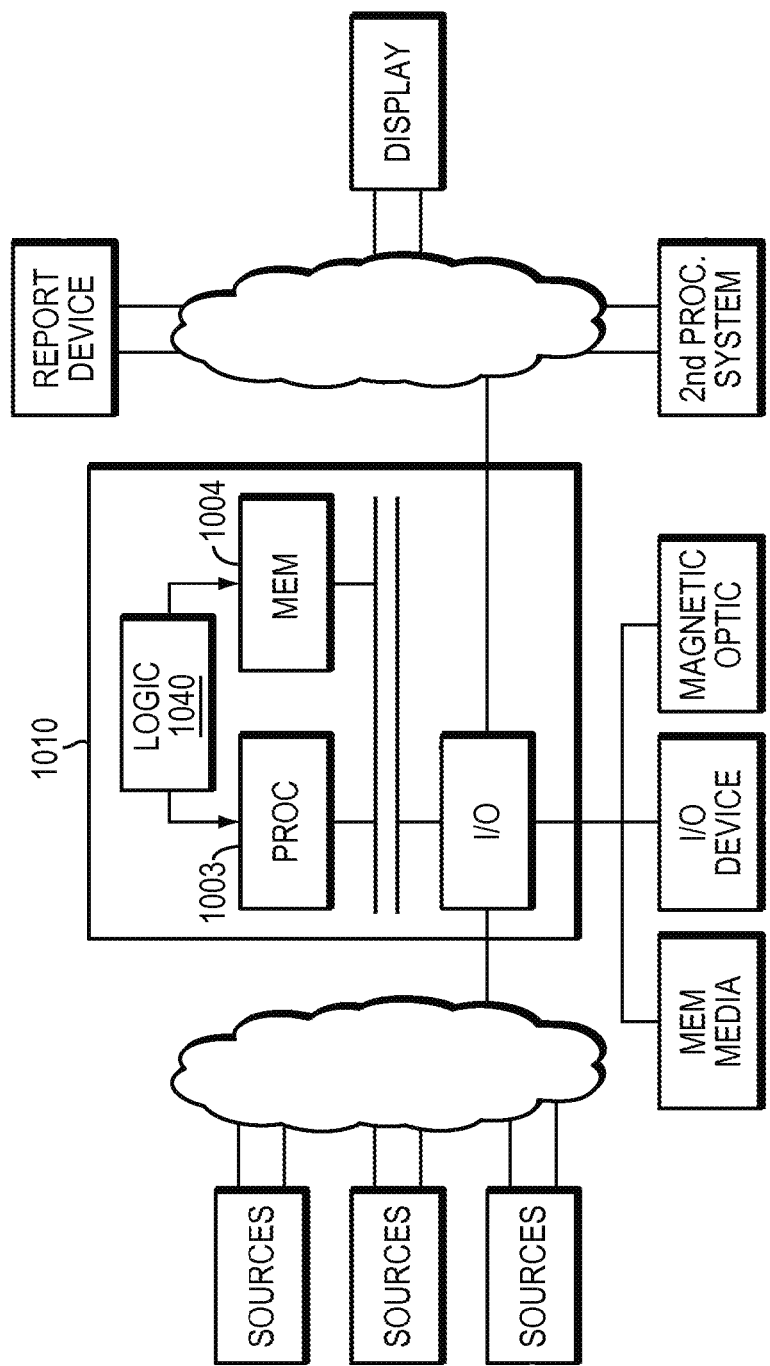
FIG. 10 is an example of an embodiment of an apparatus that may utilize the techniques described herein, in accordance with an embodiment of the present disclosure.
Figure 11:
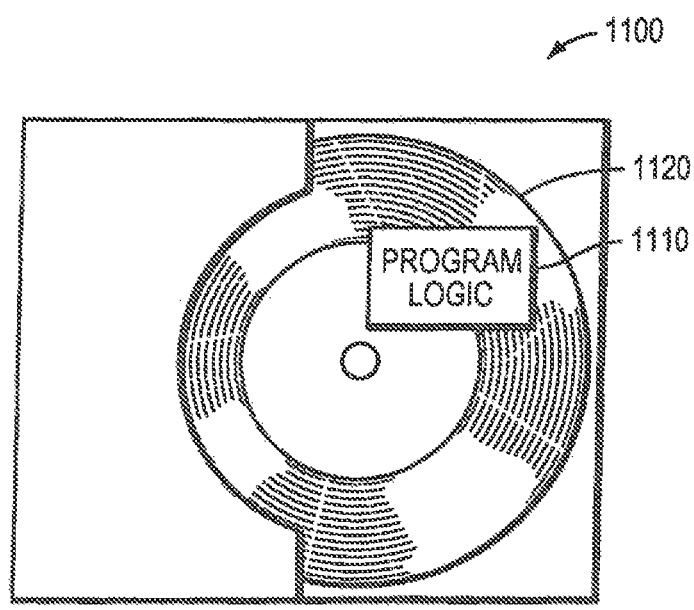
FIG. 11 is an example of an embodiment of a method embodied on a computer readable storage medium that may utilize the techniques described herein in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 10, the machine 1010 becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 11 shows Logic 1110 embodied on a computer-readable medium 1120 as shown, and wherein the Logic is encoded in computer-executable code configured for carrying out the reservation service process of this invention and thereby forming a Computer Program Product 1100. The Logic 1110 may be the same logic 1040 on memory 1004 loaded on processor 1003. The program logic may also be embodied in software modules, as modules, or as hardware modules. The program logic may be run on a physical or virtual processor.

The logic for carrying out the method may be embodied as part of the system described below, which is useful for carrying out a method described with reference to embodiments shown in, for example, FIGS. 6-9. For purposes of illustrating the present invention, the invention is described as embodied in a specific configuration and using special logical arrangements, but one skilled in the art will appreciate that the device is not limited to the specific configuration but rather only by the claims included with this specification.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer implemented method, the method comprising:
   registering cloud service providers in a cloud book, wherein the cloud book includes a profile for each cloud service provider of the cloud service providers including the services and terms of service for each cloud service provider of the cloud service providers; and
   registering a consumer in the cloud book, wherein the consumer performs following actions with the cloud book:
   connecting to other consumers registered in the cloud book;
   browsing the profiles for each of the cloud service providers and the other consumers;
   determining the services used by the other consumers, the services provided by the cloud service providers;
   comparing the services and terms of service in the profile for each of the cloud service providers;
   determining a first service provider that provides services matching the consumer; and
   signing up for services with the first cloud service provider,
   wherein the consumer traverses the connections among the cloud service providers and the other consumers to access the profile for each of the cloud service providers and service usage of the other consumers.

2. The method of claim 1 wherein the profile of each cloud service provider of the cloud service providers includes comments of the consumer on the services and reliability of the cloud service provider.

3. The method of claim 2 further comprising
   performing analytics to determine the reliability of each cloud service provider of the cloud service providers based on comments made by the consumer.

4. The method of claim 3 further comprising:
   entering, by the consumer, information about the services and reliability the consumer wants into the cloud book;
   generating a set of service providers of the service providers that match the services and reliability of the consumer; and
   presenting the set of service providers to the consumer.

5. The method of claim 3 further comprising:
   performing analytics on the comments and consumer churn for each cloud service provider of the cloud service providers to determine how cloud service providers respond to consumer input.

6. A system comprising:
   a computer having a memory and one or more processors; and
   computer-executable logic to be executed on the one or more processors for:
   registering cloud service providers in a cloud book, wherein the cloud book includes a profile for each cloud service provider of the cloud service providers including the services and terms of service for each cloud service provider of the cloud service providers; and
   registering a consumer in the cloud book, wherein the consumer performs following actions with the cloud book:
   connecting to other consumers registered in the cloud book;
   browsing the profiles for each of the cloud service providers and the other consumers;
   determining the services used by the other consumers, the services provided by the cloud service providers;
   comparing the services and terms of service in the profile for each of the cloud service providers;
   determining a first service provider that provides services matching the consumer; and
   signing up for services with the first cloud service provider,
   wherein the consumer traverses the connections among the cloud service providers and the other consumers to access the profile for each of the cloud service providers and service usage of the other consumers.

7. The system of claim 6 wherein the profile of each cloud service provider of the cloud service providers includes comments of the consumer on the services and reliability of the cloud service provider.

8. The system of claim 6 wherein the computer-executable program code is further configured for performing analytics to determine the reliability of each cloud service provider of the cloud service providers based on comments made by the consumer.

9. The system of claim 8 wherein the computer-executable program code is further configured for execution of:
   entering, by the consumer, information about the services and reliability the consumer wants into the cloud book;
   generating a set of service providers of the service providers that match the services and reliability of the consumer; and
   presenting the set of service providers to the consumer.

10. The system of claim 8 wherein the computer-executable program code is further configured for execution of:
    performing analytics on the comments and consumer churn for each cloud service provider of the cloud service providers to determine how cloud service providers respond to consumer input.

11. A program product comprising:
    a non-transitory computer readable medium encoded with computer executable program code, the code configured to:
      register cloud service providers in a cloud book, wherein the cloud book includes a profile for each cloud service provider of the cloud service providers including the services and terms of service for each cloud service provider of the cloud service providers; and
      register a consumer in the cloud book, wherein the consumer performs following actions with the cloud book:
      connecting to other consumers registered in the cloud book;
      browsing the profile for each of the cloud service providers and the other consumers;
      determining the services used by the other consumers, the services provided by the cloud service providers;
      comparing the services and terms of service in the profile for each of the cloud service providers;
      determining a first service provider that provides services matching the consumer; and
      signing up for services with the first cloud service provider,
      wherein the consumer traverses the connections among the cloud service providers and the other consumers to access the profile for each of the cloud service providers and service usage of the other consumers.

12. The computer product of claim 11 wherein the profile of each cloud service provider of the cloud service providers includes comments of the consumer on the services and reliability of the cloud service provider.

13. The computer product of claim 12 wherein the computer program code is further configured for:
    performing analytics to determine the reliability of each cloud service provider of the cloud service providers based on comments made by the consumers.

14. The computer product of claim 13 wherein the computer program code is further configured for:
    entering, by the consumer, information about the services and reliability the consumer wants into the cloud book;
    generating a set of service providers of the service providers that match the services and reliability of the consumer; and
    presenting the set of service providers to the consumer.

15. The computer product of claim 14 wherein the computer program code is further configured for:
    performing analytics on the comments and consumer churn for each cloud service provider of the cloud service providers to determine how cloud service providers respond to consumer input.

* * * * *